United States Patent [19]

Furtman et al.

[11] 4,166,290

[45] Aug. 28, 1979

[54] COMPUTER MONITORING SYSTEM

[75] Inventors: Eugene L. Furtman; Charles B. Ross; Richard D. Ashby, all of McLean, Va.; Steven D. Berliner, Sunnyvale, Calif.

[73] Assignee: Tesdata Systems Corporation, MacLean, Va.

[21] Appl. No.: 904,654

[22] Filed: May 10, 1978

[51] Int. Cl.² .............................................. G06F 11/00
[52] U.S. Cl. .................................. 364/200; 364/900
[58] Field of Search ................ 364/200, 900; 235/301, 235/302, 304

[56] References Cited

U.S. PATENT DOCUMENTS

| 3,399,298 | 8/1968 | Taylor | 364/900 |
|---|---|---|---|
| 3,522,597 | 8/1970 | Murphy | 364/900 |
| 3,540,003 | 11/1970 | Murphy | 364/900 |
| 3,588,837 | 6/1971 | Rash et al. | 364/900 |
| 3,692,989 | 9/1972 | Kandiew | 364/200 |
| 3,763,474 | 10/1973 | Freeman et al. | 364/200 |
| 3,818,458 | 6/1974 | Deese | 364/900 |
| 3,906,454 | 9/1975 | Martin | 364/900 |
| 4,084,262 | 4/1978 | Lloyd et al. | 364/900 |

Primary Examiner—Leo H. Boudreau
Attorney, Agent, or Firm—Sughrue, Rothwell, Mion, Zinn and Macpeak

[57] ABSTRACT

A computer monitoring system connects into the channel, serving as a link between a CPU and peripheral devices. Channel signals are extracted in a channel interface module, altered to be compatible with the logic in a data collection module and sent to a data collection module along with event codes generated within the channel interface module to indicate certain sequences and/or combinations of signals occurring on the channel. The data collection module is programmable to select those peripheral devices it wants to monitor and the type of information to be collected.

15 Claims, 13 Drawing Figures

COMPUTER MONITORING SYSTEM

BACKGROUND OF THE INVENTION

The present invention is in the field of computer performance monitoring equipment.

Computer performance monitoring has become an established industry within the much larger data processing industry. Performance monitoring is necessitated by the high costs of equipment, the large variety of hardware and software, and the need to optimize the utilization of such equipment. Broadly, monitoring equipment provides the user with information concerning the events taking place in computer equipment, when such events take place, and the frequency of such events. Both hardware and software and combination hardware/software monitors are presently in use. The hardware picks off signals from CPUs or peripheral devices, notes the time of occurrence of such signals, stores the signals and/or the time and/or the fact of the signal occurrence, and may provide a visual output of such information to the user. Software is used principally to format the collected data in useful form for the computer user.

The standard monitors select the signals for monitoring by attaching a probe to a line inside the CPU or peripheral device carrying the signals to be measured. The probes consist of differential amplifiers which present a high impedance to the line to which they are attached. Two significant problems with this standard method are lack of flexibility and a substantial increase in probes necessary for collecting a large variety of information. For example, once the probes are attached, the signals measured are determined. To measure different signals, the probes have to be removed and attached to other lines. Also, if it is desired to measure activity in a CPU and in a plurality of peripheral devices and collect such information, a substantial number of probes would be required and it would be necessary to provide long wires from those probes attached to distant peripheral units.

Prior art monitors are the subject of several patents. Taylor, U.S. Pat. No. 3,399,298, provides direct connection to specific elements of the host computer to be monitored. The monitor counts standard clock pulses to provide an indication of a time period during which the specific element is being checked. During that time period, a second counter is provided with the same clock pulses but only during the moments while the element being monitored is active. Thus, the ratio of the two counts in the two counters indicates an efficiency measurement for the particular device being monitored.

A patent of Martin, U.S. Pat. No. 3,906,454, is directed toward a monitor for a host computer. According to the Martin patent, the host computer must be specially programmed or arranged to provide signals that indicate to the monitor that certain other signals should be accummulated or otherwise processed for monitoring.

The Deese U.S. Pat. No. 3,818,458 departs from the technique of counting or timing individual signals received from various points in a computer, but does so by only monitoring certain specific computer status indications and recording the time at which there is a change in one of these status indications.

Other standard monitoring systems or apparatus are taught by Freeman, et al., U.S. Pat. No. 3,763,474, Murphy, U.S. Pat. No. 3,540,003, Murphy, U.S. Pat. No. 3,522,597, Rash, et al., U.S. Pat. No. 3,588,837, and Kandiew, U.S. Pat. No. 3,692,989.

SUMMARY OF THE INVENTION

It is therefore an object of the present invention to provide a computer performance monitor whih overcomes the above-mentioned problems.

According to the present invention, selection of items to be measured is not predetermined by the placement of probes but is determined in the monitoring electronics and, consequently, can be altered electronically. Also, according to the present invention, measurement of peripheral device activity is accomplished without attaching probes directly to the peripheral devices.

These objects and advantages are obtained by connecting the monitoring hardware as if it were a peripheral device to a CPU channel by picking off signals on the channel, by monitoring combinations of signals and sequences of signals and generating event codes which identify the combinations and sequences, by reducing the data picked off the channel in accordance with programmable instructions for each peripheral device on the channel, and collecting packets of information in dependence upon the event code generated.

BRIEF DESCRIPTION OF THE DRAWINGS

FIG. 11 is a block diagram of the data buffer registers shown generally in FIG. 3.

DETAILED DESCRIPTION OF THE INVENTION

A preferred embodiment of the invention will be described in the environment of monitoring the performance of an IBM 360 or 370 computer system. However, it will be understood that the invention is applicable to other computer systems.

Figure 1:
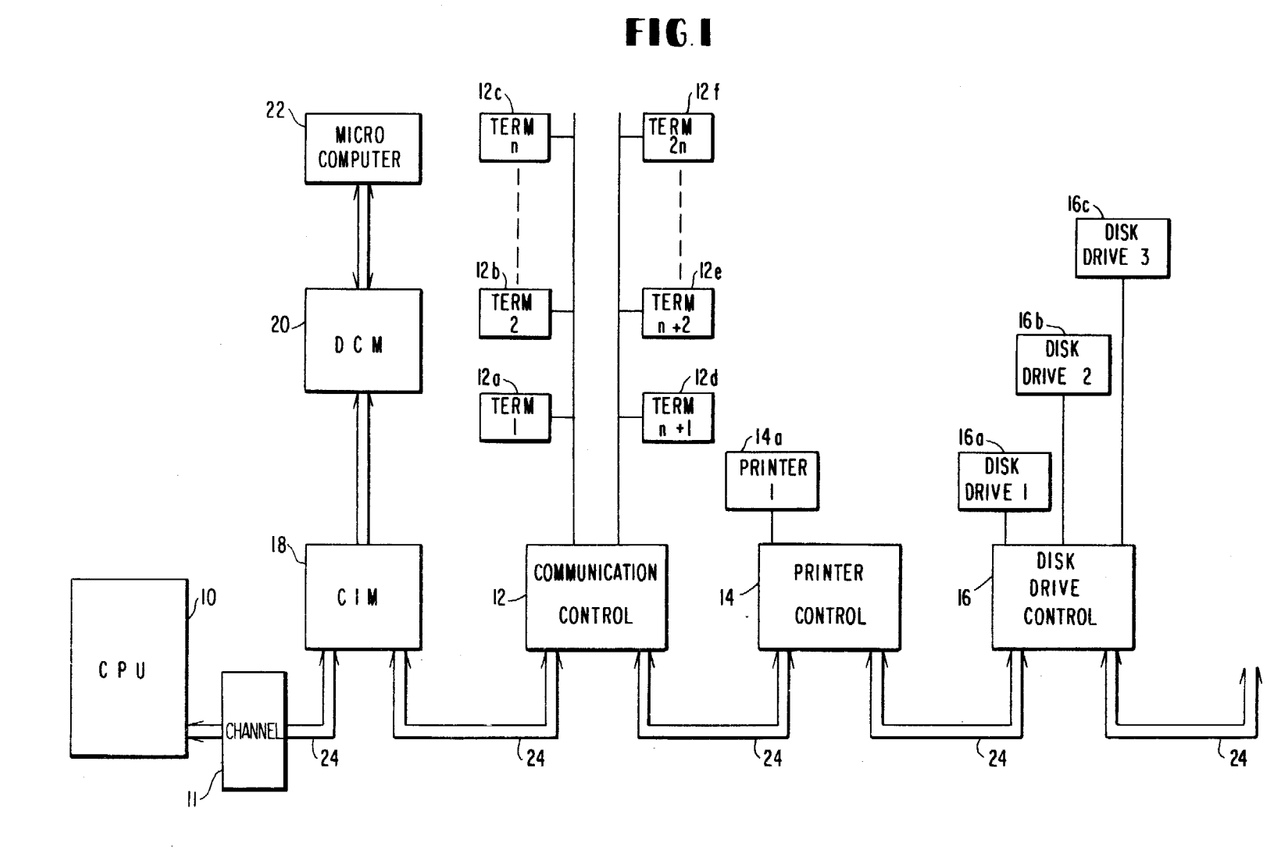
FIG. 1 is a block diagram of a preferred embodiment of the present invention as connected with a host system.

A CPU and peripheral device arrangement is shown in FIG. 1 and includes CPU 10, channel 11, channel bus 24, controllers 12-16, terminals 12a-12f, printer 14a and disk drives 16a-16c. The nine peripheral devices illustrated represent only a sampling of such devices that may be connected to the channel bus 24. The devices shown are connected to the CPU channel 11 via communication control 12, printer control 14 and disk drive control 16 and via bus 24. As is well known, the channel bus carries addressing information, commands, status information, data, and flags or control signals back and forth. The particular arrangement and sequence of such signals on an IBM 360/370 channel is disclosed in several publications. For reference, see IBM Publication No. GA-22-6974, entitled "Channel to Control Unit OEM Information."

In general, each channel bus comprises thirty-nine (39) lines, nine lines carry a parallel eight-bit word plus parity out (from the CPU), nine carry a parallel eight-bit word plus parity in (to the CPU), two are for address-in and address-out flags, respectively, one is for command-out flag, two are for service-in and service-out flags, respectively, two are for data-in and data-out flags, respectively, one is for status-in flag, two are for OP-in and OP-out flags, respectively, and one is for the hold flag. The eighteen (18) lines carrying eight-bit bytes plus parity are referred to as the bus-in and bus-out lines. Those lines carry address bytes, command bytes, status bytes and data bytes.

Although there are several sequences of signals on the channel, a typical sequence, designated as the Initial Select Sequence, is as follows: the CPU sends an address byte on the bus-out lines, designating a particular device, and raises the address-out flag; the device sends its address on the bus-in lines and raises the address-in flag; the CPU sends a command byte on the bus-out lines and raises the command-out flag; the device sends a status byte on the bus-in lnes and raises the status-in flag; the device performs the command which may be to send or receive multiple bytes of data on the bus-in or bus-out lines respectively.

According to the present invention, the activity of the devices is monitored by connecting directly to the channel bus a monitor consisting of a channel interface module (CIM) 18 and a data capture module (DCM) 20. The monitor also preferably includes its own processing unit and main memory, shown generally as a microcomputer 22, for collating the data and presenting it to the user in any of the variety of typical formats. The collation and data presentation, as well as the programming of the microcomputer, does not constitute a feature of the invention claimed herein, and consequently, details of such a process will not be provided. However, microcomputers are well known in the art, as is monitoring software. Furthermore, given the arrangement of data collated for presentation by the DCM 20, anyone of ordinary skill in the monitoring and software arts would be able to program such a known microcomputer to provide the desired collation and formatting of the information.

Among the typical devices that the invention can monitor are communications front ends such as the IBM 3705 and Comten 3670; unit record equipment, such as printers, card readers, etc.; and direct access storage devices (DASD) similar to IMB's 3330 and 3350 mass storage devices. The type of information that can be gathered on these three classes of data processing equipment is described below.

As the importance of channel communicatons increases, performance accountability of this area becomes critical. The monitor can see every event on the channel. Consequently, the user can combine data in many ways to produce measurement data. The monitor can measure communications processing delays, or the time spent on a given transaction by the host processor hardware and software, such as the amount of time between the transaction first entering the host CPU via the channel and exiting the host CPU by the same channel. The monitor also checks for sequences of signals or character strings. It can recognize character sequences of from 1 to 255 characters in length. In addition to measuring message length, it can also measure message traffic, message direction (in or out of CPU) and message rate distribution. The monitor can measure and interrogate data in a message to determine if transaction codes and key words match user supplied transactions and key words. It is also able to recognize particular sequences of signals that are embedded in a particular segment of the sequence.

Since everything on a channel bus is apparent to the monitor, unit/record events are particularly suited to be measured. Formerly, significant resources were required to measure unit/record events. But, as unit/record events process records one at a time, the monitor expends minimum resources to obtain information which formerly was difficult to obtain. For example, such measurements as the following can now be routine: number of cards read, number of cards per second (minute, hour, day, etc.), and number of lines (pages, characters, etc.) printed per page (or unit of time). Even a measurement such as the identity of the most frequently printed character is routine.

The monitor can make DASD measurements, such as: contention analysis by device and control unit; rotational position sensing timings by device; reserve/release timings by device; seek timing, seek address and seek counts by device; block size distributions; and device, control unit and channel busy statistics.

The CIM 18 monitors all of the activity on the selector or block multiplexer channel, but does not in any way interact with it. The CIM itself preferably resides under the machine room floor where it is connected directly into the channel cabling. The added resistance caused by the CIM should not exceed 2 ohms for any of the individual conductors making up the cable harness. This must remain valid for cable lengths approaching six feet in length with two IBM compatible connectors, such as the AMP models 86719-1 and 86719-2 attached to either end. In addition, the CIM must not draw more than 5 milliamps at a reference voltage of 3.11 volts from any of the bus or tage lines. The CIM must not interfere with the channel operation so that repeated CIM power interruptions will have no effect on normal channel operation. The CIM can be connected to the channel cables anywhere between the channel controller and the channel terminator The CIM performs the functions of detecting combinations and sequences of flags on the channel and generating event codes identifying the combinations and sequences, level changing and duration changing certain flags to levels and durations usable at the DCM, and multiplexing the bus-in and bus-out lines onto a single group of bus lines for presentation to the DCM. It should be noted that the CIM collects and passes on to the DCM all bytes on the bus lines–i.e., there is no selection or data sampling in the CIM.

The DCM receives the information presented to it by the CIM and operates to either ignore the information, collect packets of information, excluding data, pertaining to a particular device, collect packets of information plus a designated part of the data pertaining to a device, or collect packets of information plus disc drive CYLINDER, HEAD and SECTOR addresses when a seek or set sector command is involved. The DCM contains a control word for each device address on the CPU channel. The control word is accessed when the DCM receives the device address. The control word commands the DCM either to ignore all information pertaining to that device, to accept and form a packet of information, but no data, for that device, or to form the packet of information and collect data beginning with byte x and ending with byte y of each data transfer.

Figure 2:
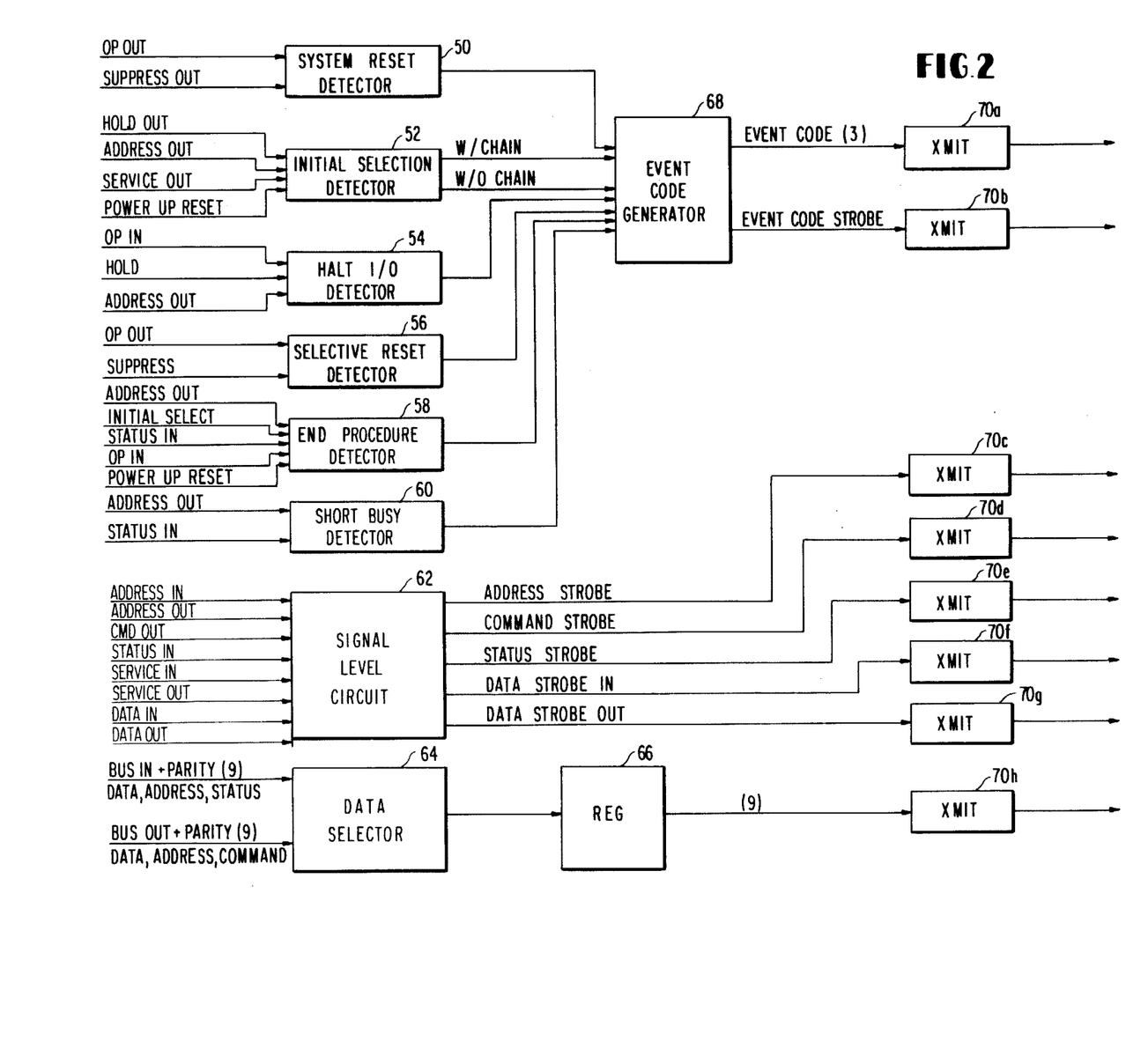
FIG. 2 is a block diagram of a channel interface module according to a preferred embodiment of the present invention.
Figure 2:
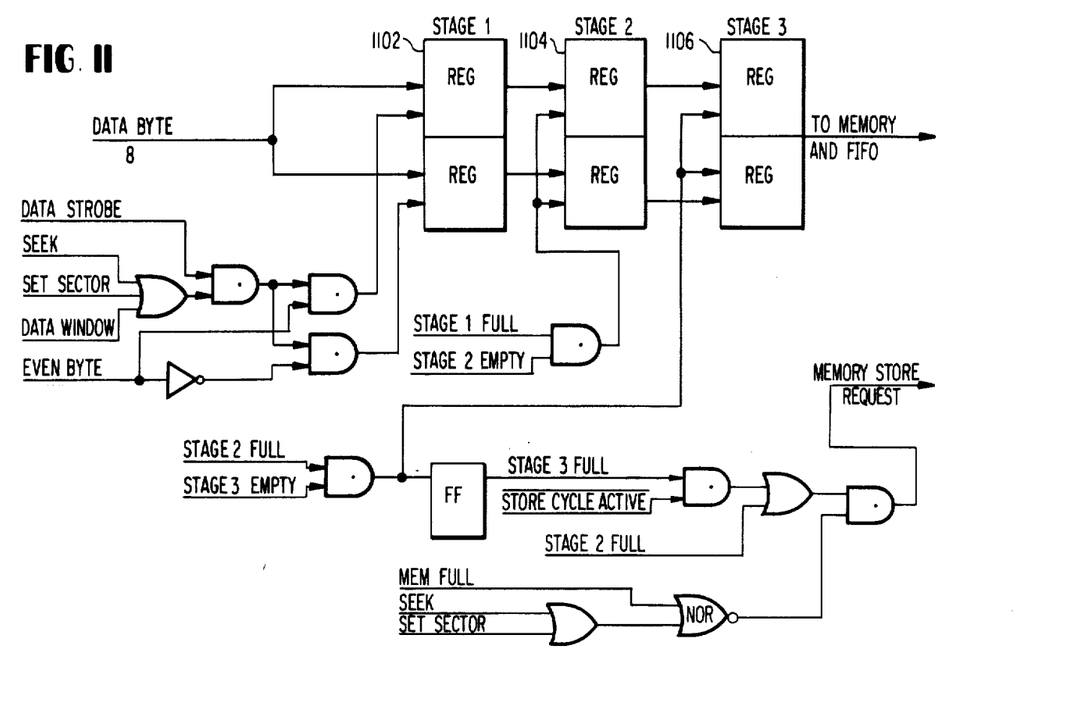

A block diagram of a CIM is illustrated in FIG. 2. It comprises a plurality of event detectors 50–60, an event code generator 68, a signal level circuit 62, a data selector 64, a register 66 and a plurality of transmit circuits 70a–70h. Each of the event detectors detects a signal state change or a certain set of or sequence of conditions on the channel and provides a TRUE or "1" output when the designated conditions are satisfied. The six detectors provide a total of seven outputs, only one of which will be TRUE at any given time. The seven detector outputs are provided to an event generator 68 which provides a unique three-bit parallel output which identifies the TRUE input line and, therefore, identifies the event detected. For each event code generated, the genertor 68 also raises the event code strobe.

The signal level circuit 62 receives eight channel flags, and, in response thereto, provides five output strobe pulses of proper level and duration for use in the DCM. The address-in, address-out, command-out and status-in flags result in the address, command and status strobes, respectively. The service-in, service-out, data-in and data-out flags result in the data strobes.

The data selector 64 receives the eight bus-in lines plus parity and the eight bus-out lines plus parity and multiplexes those lines onto eight bus lines and one parity line which are connected to a nine-bit register 66. The transmit circuits 70a–70h transmit the designated codes, strobes and data to the DCM.

Figure 5:
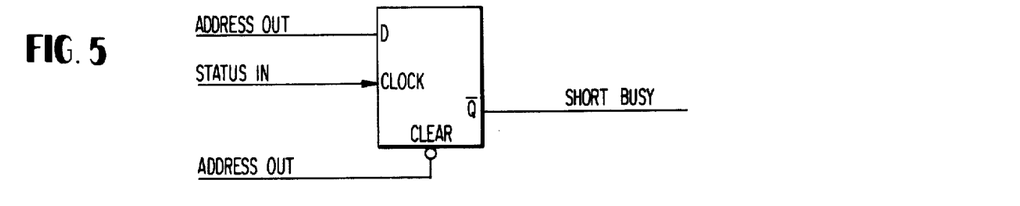
FIG. 5 is a block diagram of the short busy detector of FIG. 2.

The short busy detector 60 is shown in detail in FIG. 5 and comprises a single D flip-flop. The short busy flip-flop output becomes TRUE when the address-out flag is TRUE and status-in flag goes TRUE. The short busy event occurs when the controller for the peripheral device raises the status-in flag while the address-out flag is still up. This prevents an initial select sequence from progressing to completion.

Figure 6:
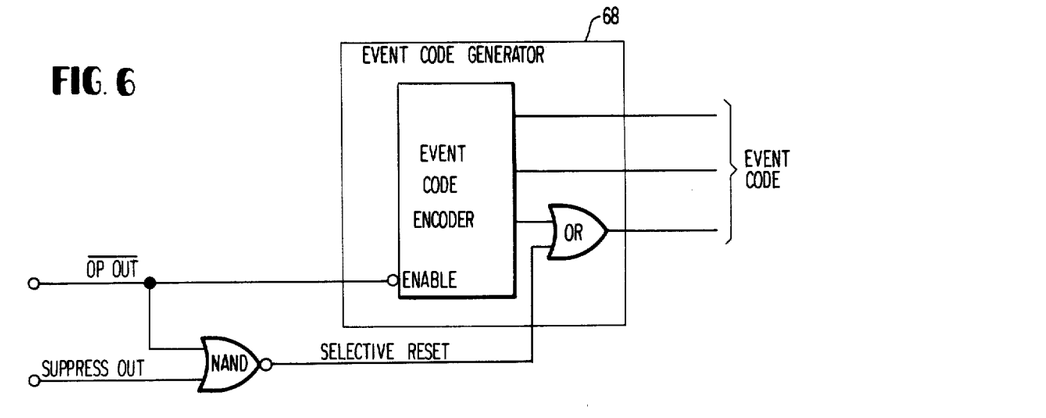
FIG. 6 is a block diagram of the system reset detector and the selective reset detector of FIG. 2.

Referring to FIG. 2, it is seen that the system reset detector 50 and the selective reset detector 56 depend upon the OP-out and suppress-out flags. In actual operation, the false state of the OP-out flag is connected to an enable input of event code generator 68, forcing all outputs to zero. The lowest order bit of the output code is connected to an OR gate, the other input being the output resulting from a NAND connection of OP-out and suppress-out. This is shown in FIG. 6. Thus, if the OP-out flag is false, there will be generated either a system reset event code or a selective reset event code, depending upon the state of the suppress-out flag.

Figure 8:
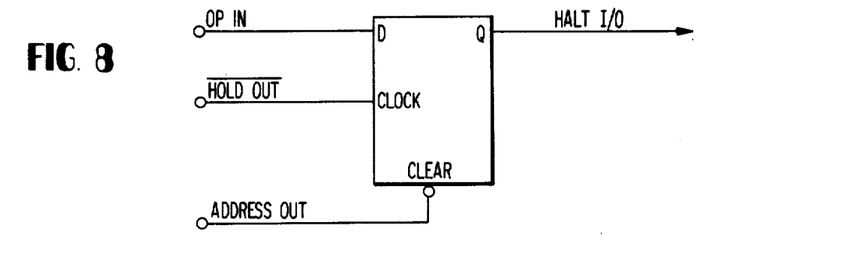
FIG. 8 is a block diagram of the halt I/O detector of FIG. 2.

The halt I/O detector 54 is shown in detail in FIG. 8 and comprises a D-type flip-flop which is clocked when the hold-out flag goes FALSE, is cleared when the address-out goes FALSE, and has the OP-in applied to its D input. As long as the address-out flag is TRUE, the flip-flop can be set to the state of the D input, which corresponds to the state of the OP-in flag whenever the hold-out flag goes FALSE.

Figure 9:
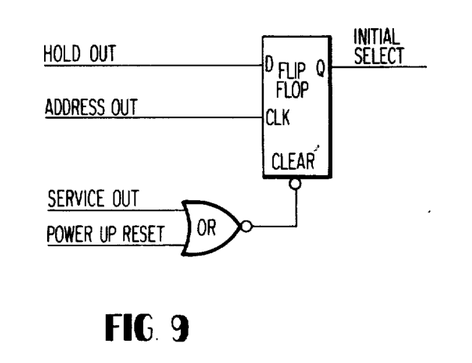
FIG. 9 is a block diagram of the initial select detector of FIG. 2.

The initial select detector 52 of FIG. 2 is shown in FIG. 9 comprising a D flip-flop and an OR gate with inverted output (i.e., a NOR gate). The flip-flop is clocked to provide a TRUE or FALSE output corresponding to the logic state of the hold-out input whenever address-out goes TRUE. The flip-flop is reset whenever service-out or power-up reset goes TRUE.

Figure 10:
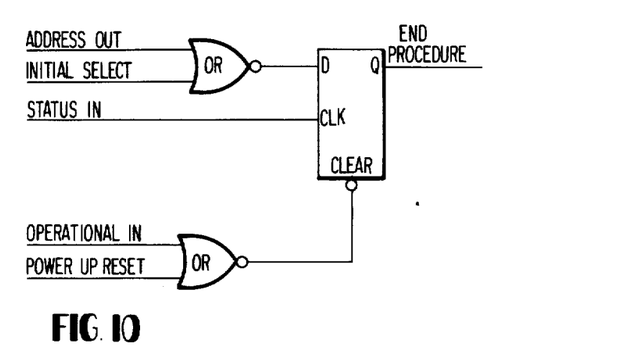
FIG. 10 is a block diagram of the end procedure detector of FIG. 2.

The end procedure detector 58 of FIG. 2 is shown in FIG. 10 as comprising a pair of OR gates with inverted outputs and a D flip-flop. The flip-flop is clocked by status-in going TRUE to assume the state corresponding to that applied to the D input. The latter is TRUE only when address-out and initial select are FALSE. The flip-flop is reset by either OP-in or power-up reset going TRUE.

Figure 3:
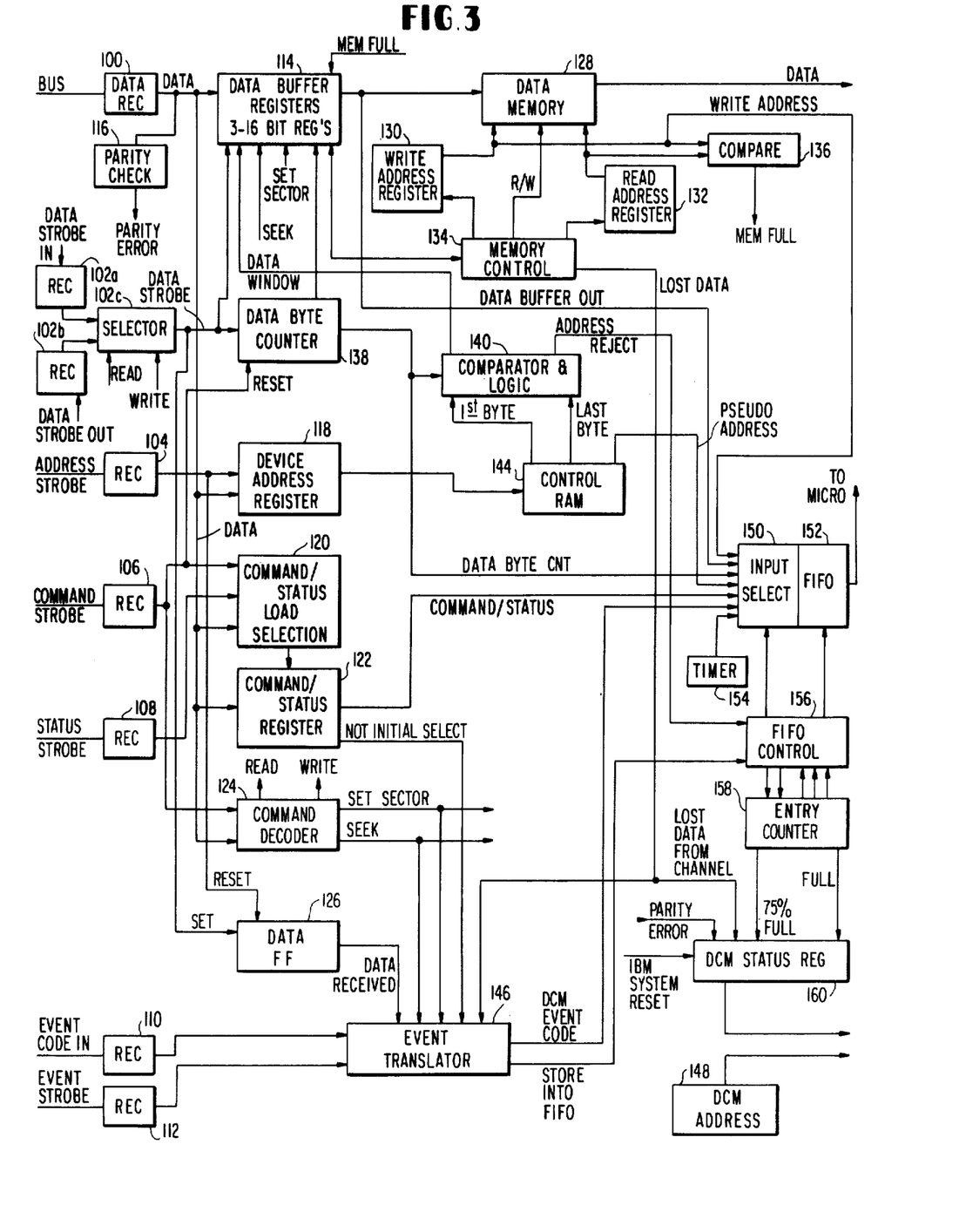
FIG. 3 is a block diagram of a data collection module according to a preferred embodiment of the present invention.

A block diagram of the data collection module is illustrated in FIG. 3. The inputs are applied thereto from the CIM, and the data collected by the DCM, which may be considered as the output data, is available to the microcomputer. The inputs from the CIM are applied to a series of receivers 100–112. The bus lines, including nine bits in parallel, one of which is the parity bit, are connected to the data receivers 100. The information carried by the bus lines may be data, an address, a command byte or a status byte. The information applied to the data receiver appears at the output thereof and is applied to parity check apparatus 116 and to data buffer registers 114. The parity check apparatus 116 provides an output parity error indication whenever the parity is incorrect. The data buffer registers 114 comprise three sixteen-bit registers arranged in six bytes. Consequently, the register holds six bytes received by data receiver 100. The data buffer register has applied thereto several control signals which determine whether the data is entered into the registers 114, and, if so, whether it is thereafter entered into data memory 128 or applied directly to an output FIFO 152. The FIFO is a first-in, first-out buffer memory. The control inputs to the data buffer registers 114 are data strobe, data window, seek, and set sector control lines. The data buffer registers 114 also receive an indication from a data byte counter 138 of the even/odd count of the data bytes and indications of memory full and store cycle active from the memory control unit 134. The outputs are data and, in the case of seek and set sector commands, address information, which are connected to the data memory 128 and the input select 150 for the FIFO circuit 152, respectively. A control output designated memory store request is applied to the memory control 134 to initiate the writing of data into memory 128.

Details of the data buffer registers 114 and associated logic are shown in FIG. 11 wherein the three register stages, each of which holds two bytes of data, are connected in cascade, with the data bytes on the bus line out of receiver 100 (FIG. 3) connected to the even and odd byte sections of stage 1. The logic condition, shown in simplified logic form, for gating the bytes into the even and odd sections, respectively, are:

DATA STROBE * EVEN NO. BYTE * (DATA WINDOW + SEEK + SET SECTOR); and

DATA STROBE * ODD NO. BYTE * (DATA WINDOW + SEEK + SET SECTOR).

The EVEN NO. BYTE and its inverse are taken from the data byte counter 138, which counts data bytes. The DATA STROBE is applied from either receiver 102a or 102b via selector 102c. Thus, if there is a DATA WINDOW from the comparator and logic 140 and a DATA STROBE from selector 102c, an even-numbered byte will be gated into the top section of stage 1 register 1102 and an odd-numbered byte will be gated into the bottom section of stage 1 register 1102. Also, the presence of a SEEK or SET SECTOR command, as detected by command decoder 124, will result in the entry of bytes into stage 1 register 1102.

If stage 2 register 1104 is empty, the contents of stage 1 will be transferred to stage 2. If stage 3 register 1106 is empty and stage 2 is full, the contents of the latter will be transferred to the former. In this manner, data always moves to the last stage of buffer registers 114. The associated logic also provides an output control signal MEMORY STORE REQUEST which is connected to the memory control 134 to intiate transfer of data from stage 3 register 1106 to the memory 128. The logic condition for generating a MEMORY STORE REQUEST is:

[SEEK + SET SECTOR + MEMORY FULL]*
[STAGE 3 FULL * STORE CYCLE ACTIVE
+ STAGE 2 FULL].

From the latter, it can be seen that the control signal will not be generated in the case of a SEEK or SET SECTOR command. In the latter cases, the data in stage 3 (representing disc drive address information) will be inputted to the FIFO by other logic described subsequently. Also, the control signal will not be generated if the memory 128 is full. Such a condition results in the generation of a MEMORY FULL signal as described hereafter. However, if there is neither a SEEK nor SET SECTOR command and the memory is not full, a MEMORY STORE REQUEST will be generated if either stage 2 is full or if stage 3 is full and the memory is not currently writing in the contents of stage 3. The STORE ACTIVE CYCLE from memory control 134 indicates that a storage cycle is presently in progress. The memory control 134, in response to a store request, applies a write signal on the read/write line to data memory 128 and, after the write is completed, increments the address in the write address register 130. The word (2 bytes) from the data buffer register 114 is, therefore, written into the memory at a location defined by write address register 130.

The data collected in data memory 128 may be called for by the microcomputer under the control of memory control 134 and read address register 132. The inputs from the microcomputer are not shown, for simplicity, but such inputs would cause a signal to be applied to the memory control 134 and a read address to be applied to read address register 132. As a result, the data memory 128 would output the data located at the address indicated by the read address register 132. Also, as long as the memory control 134 continues to receive inputs from the microcomputer, it would continue to increment the address in the read address register and output the data from the data memory 128. If the microcomputer applies a specific read address to the register 132, the series of data read from data memory 128 will be that beginning at the storage location identified by the address entered into the read address register 132. Otherwise, the data memory 128 will simply output data beginning with the address just following the last read address. Thus, under normal circumstances, the data is both read from and written into the memory locations in sequence.

A compare circuit 136 prevents input data from being written when the data memory is full and thereby destroying stored data which has not yet been read out of the data memory 128. This is accomplished by applying the write address and read address to the compare circuit 136. When the two addresses are equal, a MEMORY FULL output is applied to the memory store request circuit of unit 114 to inhibit further requests for writing into the data memory 128 (see FIG. 11). The MEMORY FULL output will remain TRUE until further information is read out of data memory 128, thereby resulting in a change of the read address 132.

As previously mentioned, the only data which gets into the data memory 128 is that which is applied to the data buffer registers 114 during the existence of the DATA WINDOW control signal. Generation of the latter control signal is one of the features which permits data reduction — i.e., receipt of all of the data, but selction on only so much of the data as the system is interested in. The apparatus for generating the DATA WINDOW will now be described. A receiver 104 receives an ADDRESS STROBE from the CIM and applies that strobe to a device address register 118. At the same time that an ADDRESS STROBE is received, the information on the input bus line will consist of the address of a device connected to the computer channel. That address on the data line will pass through receiver 100 and be gated into the device address register 118 by means of the ADDRESS STROBE. The address in the device address register 118 also addresses a control RAM 144 which has a separate address location for each device address. As a result, the control RAM 144 outputs a control word which is stored in the address corresponding to the device address. The control words stored into control RAM 144 depend upon the system's interest in the particular device whose address is in address register 118. The control word has three fields, first byte count, last byte count and pseudo address. The pseudo address, like the input address, identifies the particular device. However, the pseudo address corresponds to the address in the memory associated with the microcomputer, wherein all of the information about the device is collected. The field which is designated as the first byte count contains the number of the first byte of data which the system wants to collect. The field designated the last byte count contains a number representing the last byte of data which the systems wants to collect. For example, assume the address corresponding to a certain device arrives on the data lines 100 and is gated into the device address register 18 by the ADDRESS STROBE. Further assume that the control word for that particular device contains its pseudo address as well as a first byte count corresponding to 16 and a last byte count corresponding to 31. The pseudo address will be connected directly through the input select means 150 to the FIFO 152. The numbers corresponding to the first and last bytes will be applied to a comparator 140. Following the address of the device, the device and/or the CPU will begin putting data onto the channel. The data is picked up by the CIM and sent to the DCM on the bus lines. Also, each data word on the channel will be accompanied by a DATA STROBE which is also picked up by the CIM and applied to the DCM. The DATA STROBE is applied to receiver 102a or 102b and therethrough to a data byte counter 138. The data byte counter counts the bytes of data appearing on the channel during the particular sequence described. The output from data byte counter 138 is applied to comparator 140, wherein it is compared with the first byte count and the last byte count. When the number in the data byte counter equals the first byte count, the DATA WINDOW will go TRUE, and when the number in the data byte counter becomes greater than the last byte count, the DATA window will become FALSE. Consequently, the DATA WINDOW is TRUE for the duration that data between the designated first and last bytes are being applied to the data buffer registers 114. In this way, the control word determines the specific portion of the input data which is to be collected. The remainder of the input data is ignored.

In the case of certain devices, the system will not be interested in the data. For those devices, the control word in the control RAM 144 will have a first byte count field of one and a last byte count field of zero. Simple logic in comparator 140 recognizes this condition and blocks generation of a DATA WINDOW. For certain other devices, the system will not want any information. For those devices, the control word will have a first byte field with its most significant bit set to one and a last byte field with its most significant bit set to zero. This condition is also recognized by comparator 140. In this case, the DATA WINDOW will not be generated, but an output ADDRESS REJECT will become TRUE and will thereafter block storage of a packet of information into the FIFO 152. It is noted that the data byte counter is reset whenever the COMMAND STROBE is TRUE. It is sufficient for the present to understand that the data byte counter will be reset during every initial select sequence on the CPU channel.

The receivers 106 and 108 receive the COMMAND STROBE and STATUS STROBE, respectively. The COMMAND STROBE will occur whenever a command byte appears on the bus line, and a STATUS STROBE will appear whenever a status byte appears on the bus line. The COMMAND and STATUS STROBES, following reception by receivers 106 and 108, respectively, are applied to a command/status load selection means 120. The input from the data receiver 100 is also connected to the command/status load selection means 120. The function of the latter means is to decide whether the command byte or the status byte should be in the command/status register 122 at the time the packet of information is collected by the FIFO 152. The load selection means 120 and register 122 operate broadly as follows. Whenever a COMMAND STROBE is sensed, the load selection means gates the command byte into the register 122. If a subsequent status byte is of the form 0000XX00, where X can be either one or zero, this indicates that the sequence on the channel which has been commanded by this CPU can take place. The load selection means 120, in this case, will not gate the status byte into the register 122. The command byte will remain therein and be sent to the FIFO 152. On the other hand, if the status byte is of a form other than 0000XX00, this signifies that the commanded sequence cannot take place. In this case, the load selection means 120 will gate the status byte into the register 122 to replace the previously entered command byte. Also, the output line designated NOT INITIAL SELECT is generated internally and is TRUE when the status byte is not equal to 0000XX00.

Figure 12:
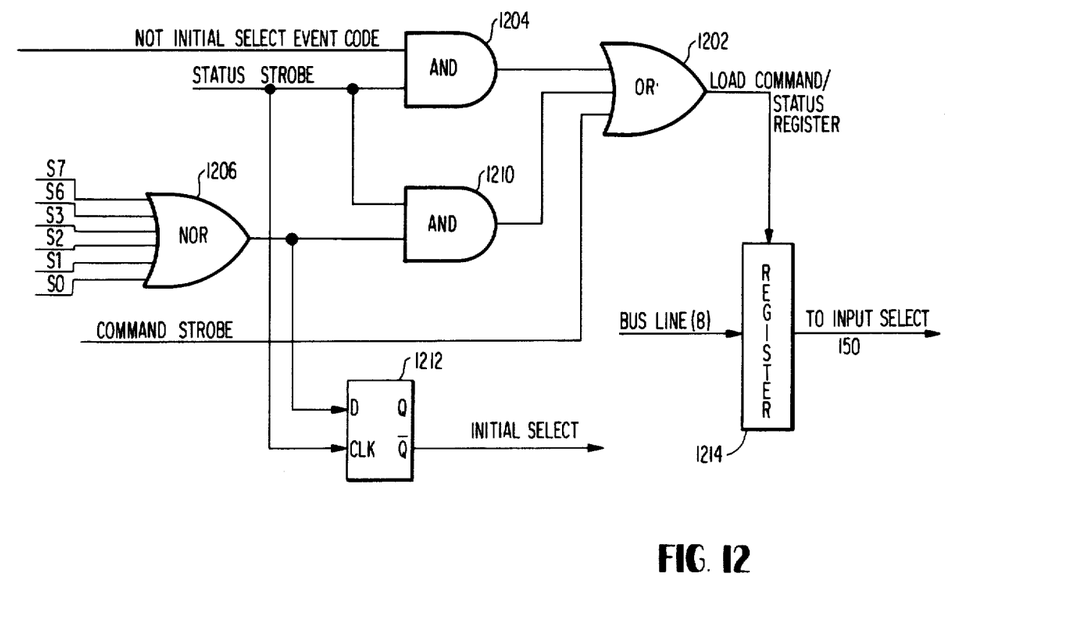
FIG. 12 is a block diagram of the command/status load selection means and the command/status register shown generally in FIG. 3.

A simple logic circuit for carrying out the logic of selection means 120 and register 122 is shown in FIG. 12. A TRUE output from OR gate 1202 commands the register 1214 to enter the eight-bit byte appearing on the bus line. This occurs under any of three conditions. First, if a COMMAND STROBE is TRUE, the LOAD COMMAND becomes TRUE. Secondly, if the STATUS STROBE is TRUE and the NOT INITIAL SELECT is TRUE, AND gate 1204 will provide a TRUE input to OR gate 1202 to cause the LOAD COMMAND to be TRUE. Thirdly, if the STATUS STROBE is TRUE and any one or more of the status byte bits S7, S6, S3, S2, S1 and S0 is TRUE, the combination of NOR 1206, invert 1208 and AND 1210 cause a TRUE LOAD COMMAND output. The NOT INITIAL SELECT control line is the Q output of a D-type flip-flop 121, whose clock input receives the STATUS STROBE and whose D input is TRUE when the status byte equals 0000XX00. Thus, when the status byte is not equal to 0000XX00, the D input will be FALSE, and a simultaneously occurring STATUS STROBE will cause the NOT INITIAL SELECT output to be TRUE. In general, this indicates that the monitored device will not carry out the initial select sequence at this time.

The bus line, as well as the COMMAND STROBE, is also applied to a command decoder 124, which functions to decode SEEK and SET SECTOR commands and to detect the read and write condition of all commands. Read or write is determined by the least significant bit of the command byte. If it is a one, the command relates to the writing of data from the channel to the control unit of the peripheral device. If it is a zero, the command relates to the reading of data from the control unit to the channel. The read and write outputs from the command decoder are applied to the selector 102c to cause selection of the data-in strobe and the data-out strobe, respectively.

In the CPU channel, the SEEK and SET SECTOR commands pertain to disk drives, and they result in a unique but short sequence of information occurring on the bus lines of the channel. The unique information is address information, but it should be distinguished from address bytes occurring along with the address flag. The latter bytes address peripheral devices. The former, which are accompanied by a data flag, represent addresses internal to the disc drives. This information is treated as data by the monitor up to and including entry into the data buffer registers. When a SEEK or SET SECTOR command occurs, the monitoring system operates to bypass the data memory 128 and to directly apply the address information in the buffer registers 114 to the FIFO 152 for subsequent collection by the microcomputer. This is accomplished by the command decoder 124 which receives the command words and provides a TRUE output on the SET SECTOR and SEEK output lines when the command is a SET SECTOR and a SEEK command, respectively. The SET SECTOR and SEEK output lines are applied to the data buffer registers 114, as described previously, to control the entry of the address information into the register 114.

A three-bit input event code is supplied to receiver 110 and gated into an event translator 146 by an EVENT STROBE which passes through receiver 112. In the specific embodiment described herein, there are seven input event codes representing seven events on the CPU channel. The input events and the respective event codes are:

| | |
|---|---|
| System Reset | 000 |
| Selective Reset | 001 |
| Halt I/O | 010 |
| Chained Initial Select | 101 |
| Unchained Initial Select | 100 |
| Short Busy | 011 |
| Ending Procedure | 110 |

The event translator 146 operates to decode the incoming event code and provide an output event code which depends in part upon the decoded input event code and in part on the prior sequence of events. In order to determine the prior sequence of events, the event translator 146 also receives the following inputs: SEEK, SET SECTOR, NOT INITIAL SELECT, DATA RECEIVED AND LOST DATA. The input designated DATA RECEIVED is applied from a data flip-flop 126 which is set by a DATA STROBE and reset whenever the ADDRESS STROBE goes TRUE. Consequently, the line designated data received will be TRUE, provided data has been received subsequent to the last ADDRESS STROBE.

The input line designated LOST DATA is taken from simple logic, shown herein as being a part of memory control 134, which renders the LOST DATA output TRUE when the MEMORY FULL output is TRUE, the data buffer registers are full and a DATA STROBE occurs. The event translator 146 also provides an output to the FIFO control means 156 to start loading of the FIFO. It will be noted that the FIFO 152, which is a FIFO register, stores information applied thereto in packets, each packet representing a group of data pertaining to a particular device connected to the CPU channel. The FIFO is shown as comprising an input select portion 150 and a FIFO 152. The input select portion 152 selects the order of information applied thereto for gating into the FIFO in dependence upon the output or DCM event code.

The information which is applied for entry into the FIFO consists of the following:

(1) Pseudo Address — This information identifies the particular device about which the information pertains, as well as identifying an address in the microcomputer memory where all of the information is to be collected.

(2) Write Address — This information indicates the ending address plus one in data memory 128 where the data from the particular device is stored.

(3) Data Byte Count — This information, which is obtained from the data byte counter 138, indicates the number of bytes of data in the data record transferred on the CPU channel.

(4) Data Buffer Out — This information, which is directly obtained from data buffer registers 114, will only be applied to the FIFO when there is a seek or set sector command. This information is the disc drive address information mentioned previously.

(5) Command/Status Word — This information designates the particular command being performed by the device or the status of the device when the command is not being carried out or an end or asynchronous status has been presented by a device to the CPU channel.

(6) Output or DCM Event Code — This is the information from the translator 146 indicating the particular event taking place on the CPU channel.

(7) Time Stamp — This is timing information from the timer 154 which indicates the time at which the above information is applied to the FIFO 152.

FIFO control means 156 is connected to an entry counter 158 which keeps track of the loading of FIFO 152. The purpose of entry counter 158 is to provide outputs indicating when the FIFO is empty, 75% full, and completely full. When the FIFO is 75% full, the designation indicating this fact is applied to a DCM status register 160. When the FIFO is completely full, meaning that the newest information applied thereto will have been lost, this designation is applied to the DCM status register 160. Other inputs applied to the DCM status register are LOST DATA, PARITY ERROR from the parity check means 116 and a system reset from the CPU channel. The contents of the DCM status register 160, which provides an indication of the previously mentioned conditions, is available to the microcomputer. The DCM also includes a DCM address 148 uniquely identifies the particular data collection module. The latter address is presented to the microcomputer along with the contents of status register 160. The DCM address is particularly useful whenever a plurality of DCMs are connected to a single microcomputer.

The input event codes mentioned above are obtained from the CIM which monitors groups of signals on the CPU channel and provides the event codes corresponding to certain channel sequences. The particular channel sequences mentioned previously are standard sequences. The groups of signals occurring on the channel and the sequence of such signals corresponding to those events may be found in several publications, including IBM Publication No. Ga-22-6974. For the purpose of providing a better understanding of the present invention, but at the risk of over-simplification, the significance of the above input sequences will be briefly set forth.

The unchained initial select sequence begins with an address being sent out on the channel from the CPU to a device and is followed in series by an address-in on the channel, a command-out on the channel and a status-in on the channel. The sequence designated chained initial select is similar to the unchained initial selected sequence but it tells us that the channel is maintaining communication with the particular device addressed even after the first command has been carried out. In other words, this means that the previous command was for the same device. The system reset sequence indicates that all of the peripheral devices attached to the channel are being reset and the halt I/O sequence indicates that the device presently selected for communication with the CPU is being instructed to effectively disconnect itself from the channel. The selective reset sequence resets one of the devices. The short busy sequence occurs when an initial select is attempted but the control unit or device addressed is busy. An ending procedure sequence occurs either at the end of transmission or is an asynchronous status indicating that a non-selected device wants to communicate on the CPU channel.

There are eleven output event codes from the event translator 146, and they are:

| | |
|---|---|
| System Reset | 0000 |
| Asynchronous Status Following A Seek Or Set Sector | 0001 |
| Asynchronous Status | 0011 |
| Unchained Initial Select | 0100 |
| Chained Initial Select | 0110 |
| Short Busy/Aborted Initial Select | 0010 |

| | |
|---|---|
| Selective Reset | 1000 |
| Halt I/O | 1010 |
| Ending Procedure | 1110 |
| Ending Procedure With Lost Data | 1111 |
| Ending Procedure Seek | 1100 |
| Ending Procedure Set Sector | 1101 |

Figure 4:
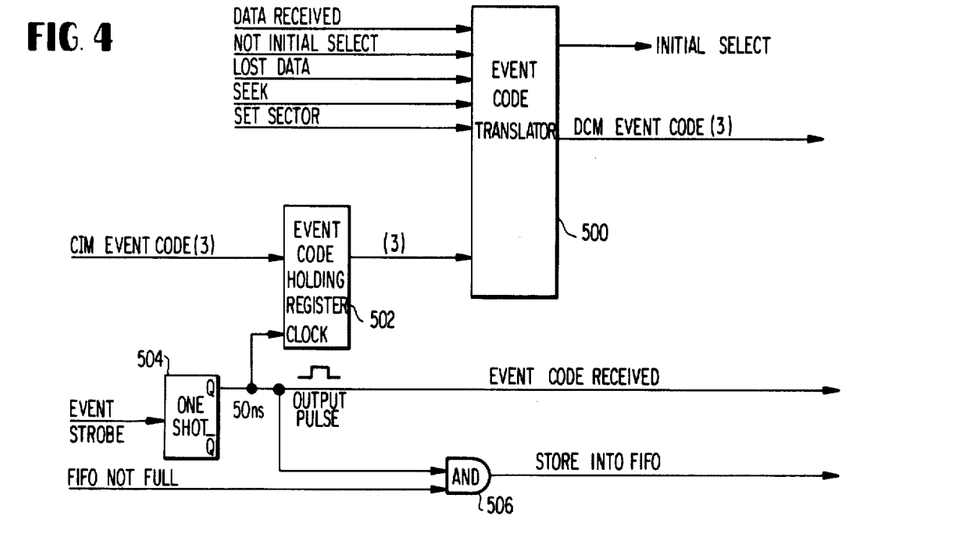
FIGS. 4 and 4a illustrate, in block diagram, the event translator of FIG. 3.

The event translator 146 of FIG. 3 is shown in greater detail in FIG. 4. As shown in FIG. 4, the input event code from the CIM is applied to an event code holding register 502 and is clocked therein by the true output from the Q terminal of a one-shot multivibrator 504, which is triggered by the event strobe. The event code held in register 502 is applied to an event translator 15 which translates the CIM event code into a DCM or output event code, depending upon certain control signals applied thereto. The TRUE output at the Q terminal of one-shot multivibrator 504 is also an output line from the event code translator 146 designated event code received. The TRUE output from the Q terminal is ANDed with a FIFO NOT FULL line from the FIFO control 156 to provide the control output store into FIFO. This may be designated as the output even code strobe.

The inputs to the event translator 500, in addition to the CIM event code, are: data received, not initial select, lost data, seek and set sector. It should be noted that usually a control line and its inverse —i.e., seek and not seek— are applied simultaneously to all logic circuitry in the system. However, in order not to needdlessly encumber the drawings and the explanation, often only one of the two control lines is indicated.

Figure 4A:
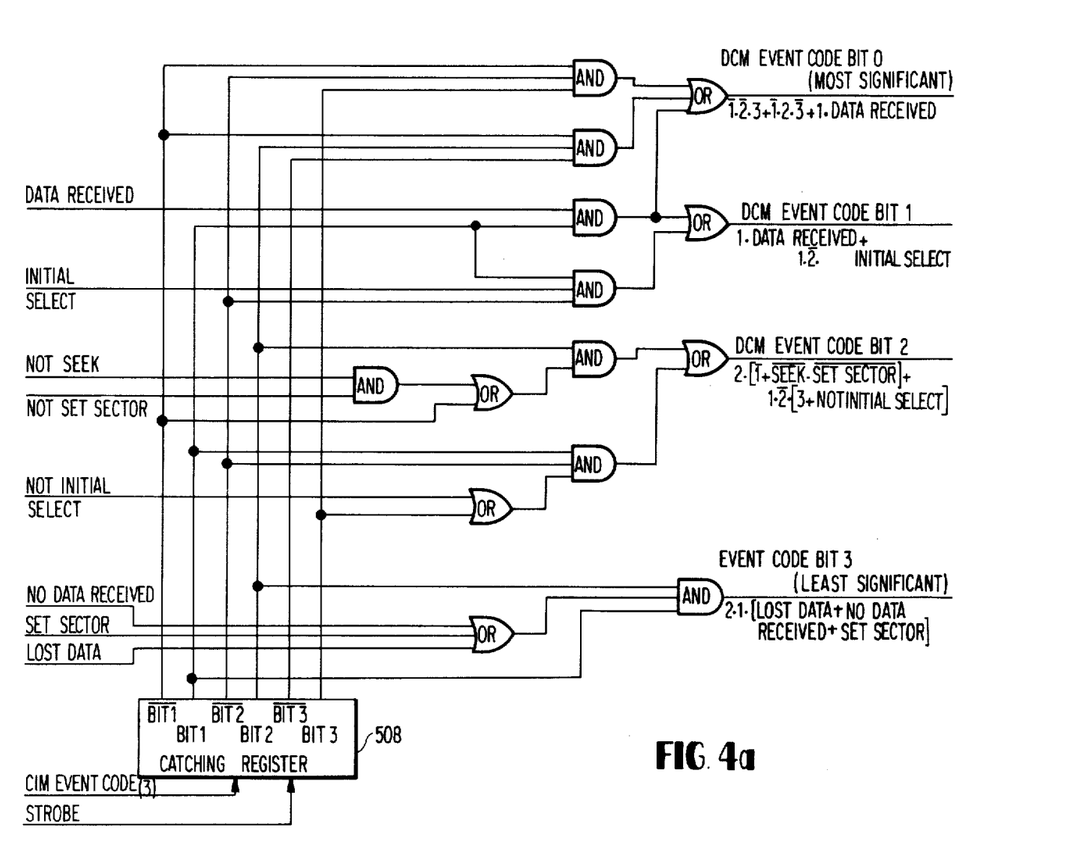

The logic of the event code translator 500 is shown in detail in FIG. 4a as comprising a latching register 508 and a plurality of AND and OR gates connected as shown. The three bits of the CIM event code are clocked into catching register 508 which provides the CIM event code bits and the inverse thereof on its six output lines. The control inputs are applied as shown, and the four output lines represent the four-bit DCM event code.

Although the relationhip between the three-bit CIM event codes and the four-bit DCM event codes can be discerned by following the logic of FIG. 4, the following explanation is offered to provide a better understanding of that relationship.

Four of the CIM event codes result in four corresponding DCM event codes, respectively, independently of the status of the control input lines. There are the events designated system reset, selective reset, halt I/O and short busy. For example, the CIM event code 001 (selective reset) will result in the output event code 1000 (selective reset).

The CIM event codes initial select and initial select with chaining will result in corresponding DCM event codes if the control line NOT INITIAL SELECT is FALSE. However, if the latter control line is TRUE, each of the above CIM event codes will be translated into the DCM event code 0010, which designates short busy or an aborted initial select.

The CIM event code end procedure (110) can be translated into any of five DCM event codes, depending on the state of several of the input control lines. If DATA RECEIVED is FALSE, the DCM event code will be asynchronous status (0011). If DATA RECEIVED is TRUE and one of SEEK, SET SECTOR or LOST DATA is TRUE, the DCM event code will be end procedure seek (1100), end procedure set sector (1100) or end procedure with lost data (1111), respectively. If DATA RECEIVED is TRUE and nne of SEEK, SET SECTOR or LOST DATA is TRUE, the DCM event code will be end procedure (1110).

Figure 7:
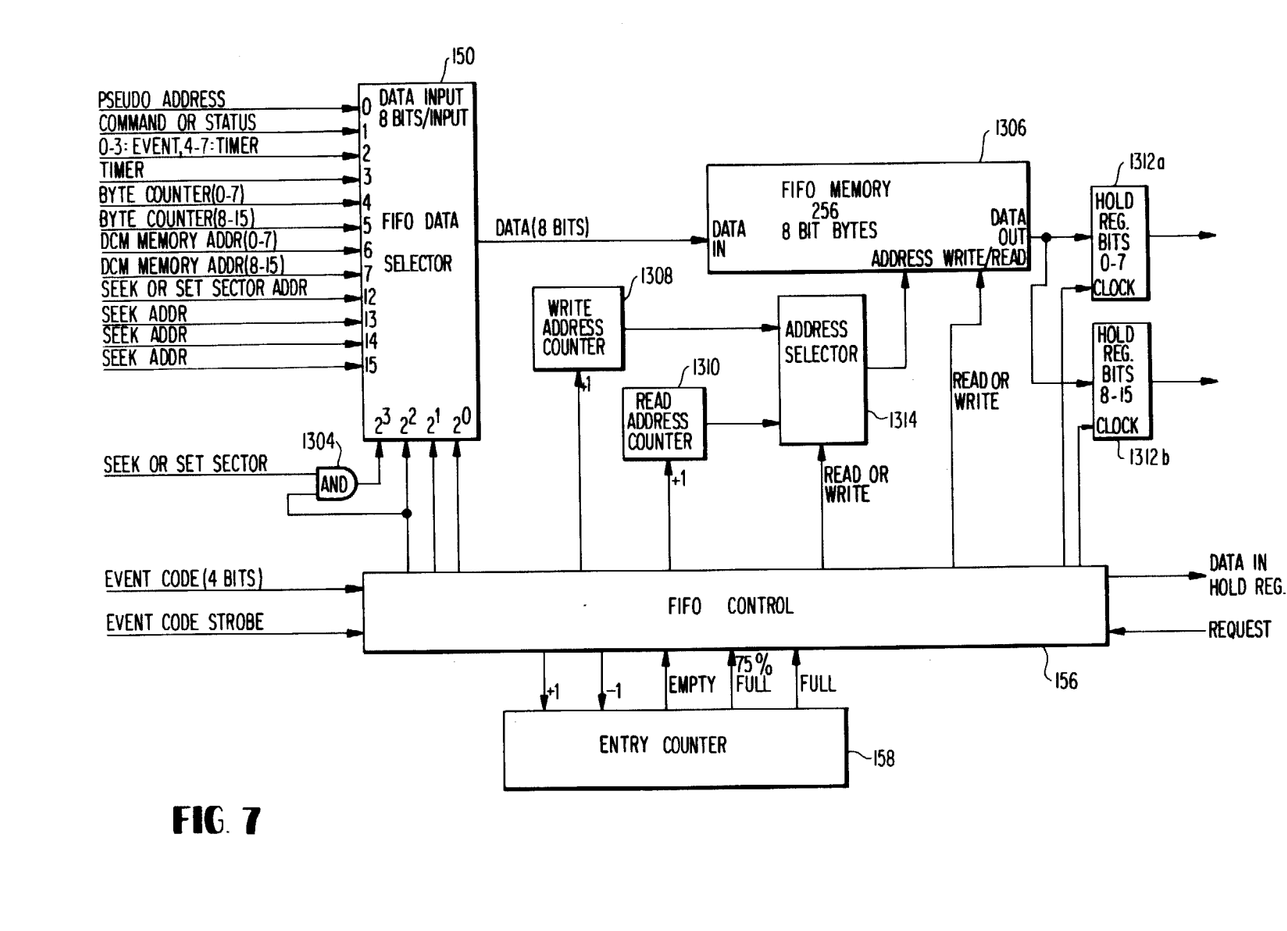
FIG. 7 is a block diagram of the FIFO and FIFO control apparatus of FIG. 3.

Referring back to FIG. 3, the data entered into the FIFO 152 for each packet is arranged in groups of words. Each packet includes either two or four words, with each word including two eight-bit bytes. A block diagram of the FIFO 152 and related apparatus —I.e., input select 152, control 156 and entry counter 158— is illustrated in FIG. 7. The eight bytes constituting the four words 0-3 of a packet are selected by FIFO data selector 150, one byte at a time, in response to the selector address.

Each of the lines, designated 0-15, applied to the FIFO data selector 150 represents an eight-bit byte, the bits being in parallel. The particular byte selected to appear at the output depends on the four-bit select address which is applied by the FIFO control means 156.

The relationship between the words 0-3, the input byte lines to selector 150, the four-bit event code applied to the FIFO control 156 and the selector address will now be explained.

Words numbered 0 and 1 will be part of every packet irrespective of the outout event code. The pseudo address, which consists of eight bits, is applied on byte line 0 and makes up the first eight bits of word 0. The command/status word, which consists of eight bits, is applied on byte line 1 and makes up the second eight bits of word 0. The four-bit output event code plus the first four bits of the twelve-bit time stamp is applied via byte line 2 and makes up the first byte of word 1. The last eight bits of the time stamp is applied via byte line 3 and makes up the second byte of word 1.

The above four byte always constitute the words 0 and 1 of the packet. When the output event code strobe goes TRUE, a counter in FIFO control 156 begins counting, starting with a count 000 and applies same to the address input of selector 150. The count advances from 000 to 011, thereby causing selector 150 to sequentially apply the bytes on byte lines 0, 1, 2 and 3 to the selector output.

Subsequent activity depends upon the output event code and the status of the SEEK or SET SECTOR input. If the most significant bit of the output event code is 0, words 0 and 1 will be the only words included in the packet of information. Thus, no further byte lines will be selected by selector 150. If the most significant bit is a 1, four words are to be included in the packet. Under the latter condition, which is easily detected in FIFO control 156 by noting the status of the most significant bit of the output event code, the counter will advance four more counts, starting with 100 and ending with 111. The selector address, however, also depends on the status of SEEK or SET SECTOR. If the latter is FALSE, the addresses applied to the selector 150 are successively: 0100, 0101, 0110 and 0111. Thus, bytes on byte lines 3, 4, 5 and 6 will be sequentially connected to the selector output to constitute words 2 and 3 of the packet. If seek or SET SECTOR is TRUE, due to AND gate 1304, the successive addresses will be: 1100, 1101, 1110 and 1111. The bytes on byte lines 12, 13, 14 and 15 will be successively selected.

The sixteen bits of the data byte counter 138 (FIG. 3) are applied to the selector on byte lines 4 and 5. The sixteen-bit DCM memory address from write address register 130 (FIG. 3) is applied to the selector on byte lines 6 and 7. The seek or set sector address, constituting four bytes obtained from data buffer registers 114 (FIG. 3), is applied via byte lines 12-15.

The bytes from selector 150 are written into FIFO memory 1306, under control of a write input from FIFO control 156, at an address corresponding to that in store address counter 1308. As the counter in FIFO control is advanced to place bytes on the selector 150 output line, the store address counter 1308 is advanced by a count of one and write input is applied to the memory 1306; also, a +1 is applied to entry counter 158.

Whenever the holding registers 1312a and 1312b are empty, FIFO control cuases bytes to be read out of FIFO memory 1306 and placed into the holding registers.

Whenever a packet is to be sent to the microcomputer for formatting and presenting to the user, a request comes in to the FIFO control. This causes the latter to present the holding register data to the microcomputer and apply a read input to memory 1306 to read out the byte stored in the address held in read address counter 1310. Two successive bytes are read from memory 1306 and held in holding registers 1312a and 1312b, respectively. The counter 1310 is advanced by a count of one for each byte read from memory 1306. Also, each byte read results in a −1 being applied to entry counter 158. The latter keeps track of the number of bytes stored in memory 1306 and causes the output lines empty, 75% full and full to go true when those respective conditions exist in memory 1306. The address selector 1314 selects a read or write address depending on whether a read or write operation is to be performed.

What is claimed is:

1. A system for monitoring the performance of peripheral devices connected to a central processing unit channel of the type which carries data, addresses, commands, status information and a plurality of condition flags, comprising:
a channel interface module connected as a peripheral device to said channel, said channel interface module comprising data selector means for receiving all said data, address, command and status information on said channel and providing same on a bus line output thereof, a signal level circuit for receiving selected condition flags on said channel and providing condition strobes at an output thereof, and event means for receiving said condition flags and providing input event codes representing selected sequences and combinations of said condition flags; and
a data collection module connected to said channel interface module and receiving all information on said bus line output, said condition strobes and said input event codes, said data collection module comprising a packet memory for storing packets of information about selected peripheral devices whenever said selected peripheral devices are accessed on the channel, a data memory for storing selected portions of data passing between said CPU and said selected peripheral device and appearing on said bus line, and means responsive to an address on said bus line for selectively controlling the entry of information pertaining to the peripheral device identifying by said address into said packet memory and for selecting a specific part or none of the subsequent data appearing on said bus line for storage in said data memory.

2. A system as claimed in claim 1 wherein said means responsive to an address comprises:
control word memory means for providing a control word unique to each received address;
first means responsive to said control word memory means for determining whether a packet of information pertaining to the peripheral device represented by said address should be collected; and
second means responsive to said control word memory means for providing a gating window to control the selection of data entered into said data memory.

3. A system as claimed in claim 2 wherein said data collection module further comprises means connected to said data memory and said packet memory for providing as an input to said packet memory an address in said data memory of data most recently entered therein.

4. A system as claimed in claim 3 wheren said data collection module further comprises a data byte counter responsive to a strobe indicating the existence of data on the bus line for counting the number of data bytes on the bus line, said data byte counter providing a count indication output as an input to said packet memory.

5. A system as claimed in claim 4 wherein said data collection module comprises command/status register means for storing therein command and status words appearing on said bus line, said command/status register means providing its contents as an input to said packet memory.

6. A system as claimed in claim 5 wherein said data collection module further comprises a command/status register for storing command and status words applied thereto and for providing its contents as an input to said packet memory, command/status load selection means responsive to those of said strobes indicating the presence of command and status words on said bus line and responsive to said command and status words on said bus line for applying a said command word when received to said command/status register and for replacing the command word in said register with selected ones of said status words.

7. A system as claimed in claim 6 wherein said data collection module comprises a buffer register connected between said bus line and said data memory, said buffer register having an output connected as an input to said packet memory and as an input to said data memory.

8. A system as claimed in claim 7 wherein said data collection module further comprises a command decoder responsive to command words on said bus line for detecting the presence of a seek or set sector command and for providing seek and set sector control signals, and logic means connected to said buffer register for entering information on said bus line into said register, said information representing addresses internal to selected ones of said peripheral devices, said last-mentioned address information being connected to said packet memory as an output of said register.

9. A system as claimed in claim 8 wherein said data collection module further comprises output event code generating means, responsive to said input event codes, a condition signal indicating the prior existence of data on said bus line, a condition signal indicating lost data preselected commands and preselected status words, for providing an output event code uniquely related to said words, condition signal and codes applied thereto, said output event code being applied as an input to said packet memory, and input selection means responsive to said output event code for selecting from the totality of inputs applied to said packet memory selected ones of said inputs for storage in said packet memory.

10. A system as claimed in claim 1 wherein said data collection module further comprises means connected to said data memory and said packet memory for providing as an input to said packet memory an address in said data memory of data most recently entered therein.

11. A system as claimed in claim 1 wherein said data collection module further comprises a data byte counter responsive to a strobe indicating the existence of data on the bus line for counting the number of data bytes on the bus line, said data byte counter providing a count indication output as an input to said packet memory.

12. A system as claimed in claim 1 wherein said data collection module comprises command/status register means for storing therein command and status words appearing on said bus line, said command/status register means providing its contents as an input to said packet memory.

13. A system as claimed in claim 1 wherein said data collection module further comprises a command/status register for storing command and status words applied thereto and for providing its contents as an input to said packet memory, command/status load selection means responsive to those of said strobes indicating the presence of command and status words on said bus line and responsive to said command and status words on said bus line for applying a said command word when received to said command/status register and for replacing the command word in said register with selected ones of said status words.

14. A system as claimed in claim 1 wherein said data collection module comprises a buffer register connected between said bus line and said data memory, said buffer register having an output connected as an input to said packet memory and as an input to said data memory.

15. A system as claimed in claim 1 wherein said data collection module further comprises output event code generating means, responsive to said input event codes, a condition signal indicating the prior existence of data on said bus line, a condition signal indicating lost data preselected commands and preselected status words, for providing an output event code uniquely related to said words, condition strobe and codes applied thereto, said output event code being applied as an input to said packet memory, and input selection means responsive to said output event code for selecting from the totality of inputs applied to said packet memory selected ones of said inputs for storage in said packet memory.

* * * * *